No. 630,009. Patented Aug. 1, 1899.
A. G. SMALLEY
DRINK MIXER.
(Application filed June 5, 1899.)
(No Model.)

WITNESSES
Frank G. Parker
Anna C. Kingsbury

INVENTOR
Albert G. Smalley

UNITED STATES PATENT OFFICE.

ALBERT G. SMALLEY, OF BOSTON, MASSACHUSETTS.

DRINK-MIXER.

SPECIFICATION forming part of Letters Patent No. 630,009, dated August 1, 1899.

Application filed June 5, 1899. Serial No. 719,479. (No model.)

*To all whom it may concern:*

Be it known that I, ALBERT G. SMALLEY, of Boston, in the county of Suffolk and State of Massachusetts, have invented a new and useful Improvement in Shaker Attachments for Tumblers, &c., of which the following, taken in connection with the accompanying drawings, is a specification.

My invention relates to a ring of soft material to be used between the open ends of two tumblers or similar vessels to form a temporary water-tight joint, leaving a free communication from the interior of one tumbler to that of the other and yet to prevent any escape of the liquid contents, the object being to furnish a cheap portable article that may be used in connection with two tumblers or other similar vessels for the purpose of a shaker or mixer for liquids or liquids and any desired ingredients. This object I attain by the mechanism shown in the accompanying drawings, in which—

Figure 1:
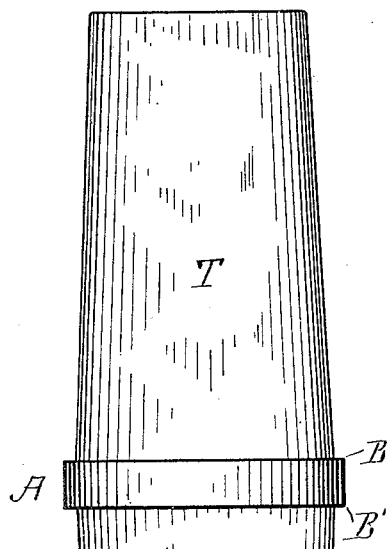
Figure 2:
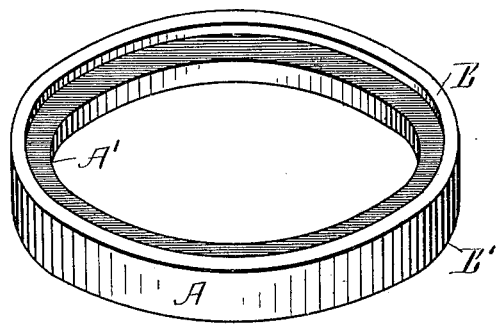
Figure 3:
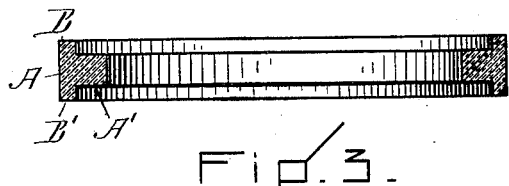

Figure 1 shows in elevation two drinking-tumblers with one of my shaker-ring attachments interposed. Fig. 2 shows one of my attachments in perspective. Fig. 3 is a vertical section of one of my attachments.

I have used for illustration in Fig. 1 two ordinary drinking-tumblers T and T' with one of my attachments A placed between the open ends of them. When thus combined, the whole constitutes a very convenient and complete shaking device.

The shaker attachment or ring A is molded and of a single piece having a flat ring-like member A', which is interposed in use directly between the edges of the tumblers or other vessels and is to form a liquid-tight joint. The other members B and B' constitute raised guard edges and serve to prevent the vessels slipping or moving edgewise while in use. The members B and B' being located outside of the edges of the vessels serve to prevent any spray from flying from the vessels while being violently agitated.

All of the parts of this device are integral and should be made of some yielding non-absorbent material—like rubber or gutta-percha, for instance.

I claim—

A shaker attachment for tumblers and similar vessels, consisting of a ring of yielding, non-absorbent material, molded and integral as to all of its parts, having a flat member adapted to interpose between the edges of the two vessels, thereby closing the joint between them, and two raised members adapted to form outer guards whereby the two vessels are prevented from slipping edgewise; substantially as and for the purpose set forth.

In testimony whereof I have signed my name to this specification, in the presence of two subscribing witnesses, on this 2d day of June, A. D. 1899.

ALBERT G. SMALLEY.

Witnesses:
FRANK G. PARKER,
ANNA C. KINGSBURY.